United States Patent Office 2,797,154
Patented June 25, 1957

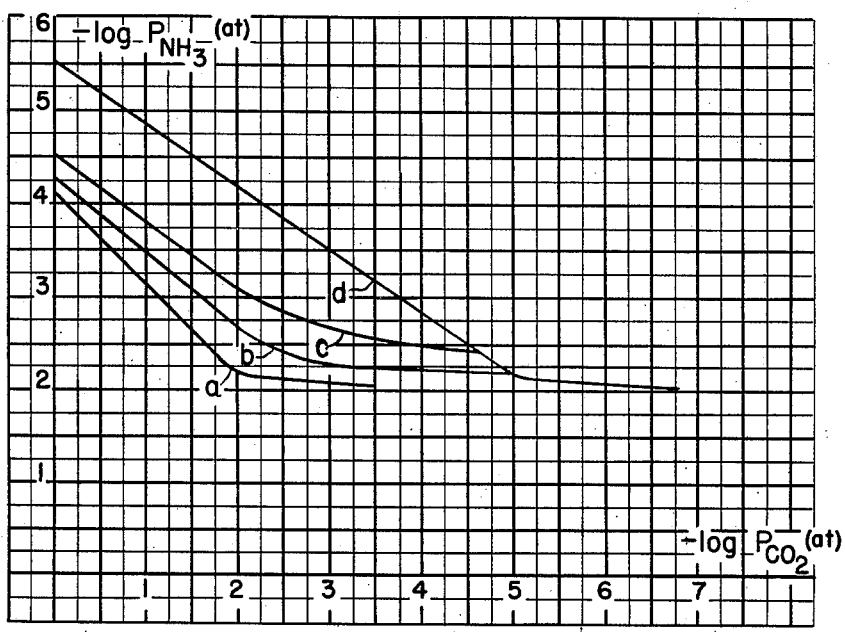

2,797,154

TREATING URINE WITH CARBON DIOXIDE TO MAKE A LIQUID FERTILIZER

Yrjö Kauko, Helsingfors, Finland

Application November 4, 1952, Serial No. 318,573

Claims priority, application Finland November 6, 1951

6 Claims. (Cl. 71—11)

For a long time it has been known that the nitrogen present in the urine of mammals, especially domestic animals, and man, may be utilized for fertilizing purposes. It has been found, however, that large amounts of nitrogen will be lost and thus cannot be utilized, due to the fact that the urine when stored is subjected to certain chemical changes generally referred to as "acid fermentation" and "alkaline fermentation," as in the beginning of this decomposition process the urine is still acid but then gradually becomes alkaline as the fermentation proceeds. The decomposition is brought about by microorganisms which with the aid of their urease content will break down the urine, with simultaneous evolution of ammonia and carbonic acid. In this manner the partial pressure exerted by the ammonia is increased, resulting in the characteristic ammonia smell of decomposing urine and loss of nitrogen.

The invention provides a method of preventing nitrogen losses apt to occur when the urine or liquid manure is stored and thus subjected to decomposition. According to the invention the urine is adjusted to a pH below 7 and preferably not above 6.8 by the action of "carbonic acid." (This term as used here and below comprises carbon dioxide, i. e. carbonic anhydride as well as the compound $H_2CO_3$ which is unstable in higher concentrations but lends itself to forming carbonates.)

It is not a new discovery that ammonia losses from ammoniacal solution may be prevented by lowering the pH of said solutions. From an economical point of view, however, even the cheapest of all the inorganic acids, viz., sulfuric acid, is too expensive to be used as an addition to urine or liquid manure for preventing nitrogen losses. The prevention of such losses is achieved in an economical manner according to the invention by adjustment of the pH of the urine to a value below 7 and preferably not above 6.8 by the addition of carbonic acid.

The lowering of the pH of the urine by the action of carbonic acid may be brought about in various ways, for instance by liberating carbonic acid from the substances present in the urine which are capable of forming free carbonic acid, or by introducing carbonic acid or a gas containing carbonic acid into the urine.

The bicarbonates present in fresh urine are substances forming a convenient source of carbonic acid. For this purpose the urine is admixed with salts of cations forming carbonates of low solubility, such as calcium ions, and of anions forming water-soluble salts with said cations. The bicarbonates of the urine will react with these salts, forming insoluble carbonates and liberating carbonic acid. Additions of calcium nitrate have proved to be particularly advantageous, possibly because the nitrate ions have a preventive or at least a retarding effect on the decomposition of the urea due to urease. On the other hand, one may also add calcium superphosphate, or several different calcium salts. According to a preferred embodiment of the invention the liquid urine is already in the stable admixed with calcium nitrate in an amount sufficient to lower its pH to such a degree as to prevent loss of ammonia. When the liquid manure is then stored in large tanks its pH may gradually rise again and bring back the danger of ammonia losses; at that time it will be suitable to add further amounts of calcium salt, preferably superphosphate.

The maximum amount of salts added for liberating carbonic acid should be such as to be equivalent to the sum of the amount of ammonia that may be formed from the urea of the urine and of the amount of bicarbonates present in the fresh urine.

In many cases ammonia losses may thus be avoided in stored urine by way of liberating carbonic acid in the aforesaid manner from the substances present in the urine. A still safer and more perfect method of preventing ammonia losses consists in treating the urine with carbonic acid or gases containing carbonic acid, because the ammonia partial pressure will decrease when the carbonic acid partial pressure is increased. Thus, a raising of the carbonic acid pressure according to the invention will prevent the nitrogen losses that would otherwise arise due to evolution of ammonia during the storage of the urine. If for instance the ammonia content of the urine is increased to 0.3 mol per 1 liter of liquid due to urease action the partial pressure of the ammonia will amount to $10^{-2}$ at., causing a considerable loss of nitrogen. If such a urine is treated with a gas in which the partial pressure of the carbonic acid amounts to $10^{-1}$ at., the ammonia partial pressure will be brought down to $10^{-3}$ at. or 0.8 mm. Such a urine solution may be stored over a longer period without any appreciable nitrogen loss due to ammonia evaporation. Nitrogen losses may be still further reduced if, in a known manner, the urine in the storage tanks is covered with a thin oil film.

For practically carrying out the embodiment of the invention described above it is suitable to employ some cheap gas source containing carbonic acid, such as flue gas. The carbonic acid pressure in ordinary flue gas amounts to $10^{-1}$ at., and as mentioned above such a mixture of gases is liable to reduce the ammonia pressure in the urine to $10^{-3}$ at. The effect of the carbonic acid or gas containing carbonic acid may be further increased if the urine is additionally admixed with salts of cations forming insoluble carbonates, e. g. calcium ions and of anions forming water-soluble salts with said cations. Suitable salts of this kind are calcium chloride, calcium nitrate and calcium superphosphate, and if desired also two or more of these salts may be employed. In this manner the ammonia partial pressure will be reduced still more than by the sole introduction of carbonic acid or gases containing carbonic acid without any other treatment. The amount of salt added should preferably be about equivalent to the amount of ammonia formed in the urine. If calcium superphosphate is employed it should be added in such an amount as to give the urine a content of 1–2 mols (preferably 1.3–1.5 mols) $NH_3$ per 1 mol phosphoric acid. The phosphates of course have a fertilizing effect already in themselves and will thus improve the fertilizing properties of the urine or liquid manure. The invention also comprises the addition of other salts capable of improving the fertilizing properties of the liquid manure, such as e. g. potassium salts.

As mentioned above, the best results will be obtained by a combination of the step of introducing carbonic acid and the step of adding salts forming carbonates of low solubility, such as calcium salts. By solely introducing a flue gas with a carbonic acid pressure of 0.1 at. the partial pressure exerted by the ammonia in the urine will only be reduced to $10^{-3}$ at., but a much greater reduction of the ammonia pressure may be achieved if calcium salts are added to the urine simultaneously with or prior to the introduction of carbonic acid. For instance, by admixing urine already subject to decomposition with 0.5 mol calcium ions per liter in the form of calcium chloride and then treating it with a gas in which the carbonic acid partial pressure amounts to $10^{-1}$ at. the ammonia partial pressure will be decreased to about $10^{-5}$ at. or only about $\frac{1}{100}$ of the pressure obtained by only treating the urine with a gas with $10^{-1}$ at. carbonic acid pressure, without adding any calcium salt either simultaneously with or prior to said gas treatment. At this low ammonia pressure (0.008 mm.) obtained by the combined gas and salt treatment there will be no danger of nitrogen losses even if the urine or liquid manure is stored over an extended period of time.

Whenever calcium salts are added according to the invention it is advisable to separate the urine from the precipitate formed, thus avoiding the danger of a reversed reaction.

As mentioned above, if superphosphate is employed it should preferably be added in such an amount as to give the urine a content of about 1–2 and preferably 1.3–1.5 mols $NH_3$ per 1 mol phosphoric acid. Superphosphate consists mainly of primary calcium phosphate and thus contains almost 2 molecules of phosphoric acid per each calcium atom. If the superphosphate is added to the urine there will at first be formed a primary ammonium phosphate containing 1 mol ammonium per 1 mol phosphoric acid. If the pH of the solution lies around 7 about 50% of the phosphoric acid is subject to secondary dissociation, 1 mol phosphoric acid thus neutralizing aditionally half a mol of ammonia. It follows that at a pH of 7, 2 mols phosphoric acid will neutralize 3 mols ammonia. However, in order to reduce the ammonia partial pressure as much as possible it is desirable to hold the pH of the solution below 7 which will involve a reduction of the secondary phosphoric acid dissociation so that at a pH of 6.8, 1 mol phosphoric acid will only neutralize about 1.3 mol ammonia. Careful measurements have shown that the urine solution has a pH of 6.75 on introduction of a flue gas containing 10% carbon dioxide and addition of superphosphate in such an amount that the urine will then contain 1 mol phosphoric acid per 1.3 mol ammonia. The ammonia pressure corresponding to this pH value is $10^{-4.75}$ at. At such a low ammonia pressure the urine may be stored without any danger of nitrogen losses.

The attached drawing illustrates the effect brought about by the invention. The values of the abscissa represent the negative logarithms of the carbonic acid pressure while those of the ordinate represent the negative logarithms of the ammonia pressure. Curve ($a$) shows the relation carbonic acid pressure to ammonia pressure in urines without salt additions; curve ($b$) shows this relation in solutions with an addition of calcium chloride of 0.16 mol per liter urine; curve ($c$) shows the same relation with a calcium chloride addition of 0.32 mol per liter urine; and finally curve ($d$) shows the same relation with 0.5 mol calcium chloride per liter urine. These curves reveal that the negative logarithm of the ammonia pressure increases (i. e. the ammonia pressure decreases) when the negative logarithm of the carbonic acid pressure decreases (i. e. the carbonic acid pressure increases). Furthermore, this effect is enhanced considerably when the urine has additionally been admixed with a salt, e. g. calcium chloride the intensification of said effect being increased with increased salt additions.

I claim:
1. A method of preparing liquid animal manure containing urine for storage in the liquid state, thereby preventing nitrogen losses during such storage, which consists in introducing carbon dioxide into said manure in amount sufficient only to lower the pH of said manure to below 7.

2. A method of preparing liquid animal manure containing urine for storage in the liquid state, thereby preventing nitrogen losses during such storage, which consists in introducing a gas mixture containing carbon dioxide into said manure in an amount sufficient only to lower the pH of said manure to below 7.

3. A method of preparing liquid animal manure containing urine for storage in the liquid state, thereby preventing nitrogen losses during such storage, which consists in introducing flue gas into said manure in an amount sufficient only to lower the pH to below 7.

4. A method of preparing liquid animal manure containing urine for storage in the liquid state, thereby preventing nitrogen losses during such storage, which consists in introducing flue gas having a carbon dioxide partial pressure of about $10^{-1}$ atm. into said manure in an amount sufficient only to lower the pH to below 7.

5. A method of preparing liquid animal manure containing urine for storage in the liquid state, thereby preventing nitrogen losses during such storage, which consists in introducing into said manure calcium salts and carbon dioxide in an amount sufficient only to lower the pH to below 7.

6. A method of preparing liquid animal manure containing urine having bicarbonates for storage in the lquid state, thereby preventing nitrogen losses during such storage present therein which consists in introducing calcium salts into said manure, which salts react with said bicarbonates to precipitate calcium carbonate, introducing carbon dioxide into said manure in an amount sufficient only to lower the pH to below 7 and removing the precipitated calcium carbonate to prevent a retrograde reaction.

References Cited in the file of this patent
FOREIGN PATENTS

| | | |
|---|---|---|
| 5,173 | Great Britain | Dec. 10, 1880 |
| 17,000 | Great Britain | Dec. 28, 1886 |
| 11,924 | Great Britain | Sept. 16, 1909 |
| 335,175 | Great Britain | Sept. 15, 1930 |
| 349,592 | Great Britain | June 1, 1931 |